US 12,425,738 B2

(12) United States Patent
Rafferty et al.

(10) Patent No.: US 12,425,738 B2
(45) Date of Patent: Sep. 23, 2025

(54) TIME-MULTIPLEXED ILLUMINATION BLENDING

(71) Applicant: MOTOROLA SOLUTIONS, INC., Chicago, IL (US)

(72) Inventors: Joseph Rafferty, Corona, CA (US); William Fincannon, Allen, TX (US); Pietro Russo, Melrose, MA (US); Chan Yi Siew, Penang (MY); Peter L. Venetianer, McLean, VA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 130 days.

(21) Appl. No.: 18/491,444

(22) Filed: Oct. 20, 2023

(65) Prior Publication Data

US 2025/0133293 A1   Apr. 24, 2025

(51) Int. Cl.
*H04N 23/69* (2023.01)
*G06T 7/70* (2017.01)
*H04N 23/71* (2023.01)
*H04N 23/74* (2023.01)

(52) U.S. Cl.
CPC .............. *H04N 23/69* (2023.01); *G06T 7/70* (2017.01); *H04N 23/71* (2023.01); *H04N 23/74* (2023.01)

(58) Field of Classification Search
CPC ........ H04N 23/69; H04N 23/71; H04N 23/74; G06T 7/70
USPC ..................................................... 348/207.99
See application file for complete search history.

(56) References Cited

U.S. PATENT DOCUMENTS

| 7,461,948 B2 * | 12/2008 | van Voorst Vader .. G03B 15/05 362/244 |
| 10,674,081 B2 | 6/2020 | Zhou et al. |
| 2005/0074233 A1 * | 4/2005 | Seo ......................... G03B 15/06 396/200 |
| 2005/0103854 A1 * | 5/2005 | Zhu ..................... G06K 7/10732 235/462.45 |

(Continued)

FOREIGN PATENT DOCUMENTS

JP   2016066947 A   4/2016

OTHER PUBLICATIONS

International Search Report and Written Opinion for Application No. PCT/US2024/051957 dated Jan. 7, 2025 (16 pages).

(Continued)

*Primary Examiner* — Usman A Khan
(74) *Attorney, Agent, or Firm* — Michael Best & Friedrich LLP

(57) ABSTRACT

Examples provide a variable zoom imaging system including an image sensor, a set of illumination channels, and a current driver circuitry for driving the set of illumination channels. Each respective illumination channel includes a set of light sources and a lens, and is associated with a respective focus distance. An electronic processor is configured to focus the image sensor to an object of interest, determine a distance from the image sensor to the object of interest, determine an exposure period for the image sensor, select a subset of illumination channels to activate based at least on the distance from the image sensor to the object of interest, and capture a first image of the object of interest using the image sensor by sequentially activating and deactivating each selected illumination channel of the subset for first respective time frames within the exposure period.

20 Claims, 6 Drawing Sheets

(56) References Cited

U.S. PATENT DOCUMENTS

| | | | |
|---|---|---|---|
| 2009/0208198 A1* | 8/2009 | Khuntia | G03B 17/18 |
| | | | 396/174 |
| 2010/0021151 A1 | 1/2010 | Nübling | |
| 2010/0128162 A1 | 5/2010 | Tanaka | |
| 2010/0322613 A1* | 12/2010 | Khuntia | G03B 15/02 |
| | | | 396/157 |
| 2012/0320218 A1 | 12/2012 | Mori et al. | |
| 2013/0064531 A1* | 3/2013 | Pillman | H04N 23/56 |
| | | | 396/62 |
| 2016/0049429 A1* | 2/2016 | Lee | H10F 39/18 |
| | | | 257/231 |
| 2017/0104939 A1 | 4/2017 | Sun | |
| 2018/0352241 A1* | 12/2018 | Gatt | H04N 23/73 |
| 2022/0159167 A1* | 5/2022 | Thuresson | H04N 23/56 |

OTHER PUBLICATIONS

Darmadi, "Strobed IR Illumination for Image Quality Improvement in Surveillance Cameras," KTH Royal Institute of Technology Thesis Report, 2018, 49 pages.

* cited by examiner

TIME-MULTIPLEXED ILLUMINATION BLENDING

BACKGROUND

Imaging systems can include object recognition functions that are carried out entirely within a camera, entirely outside of the camera, or even partially inside and partially outside of the camera. For object recognition functions, precise lighting can facilitate identifying and analyzing objects of interest in captured images.

Figure 1:
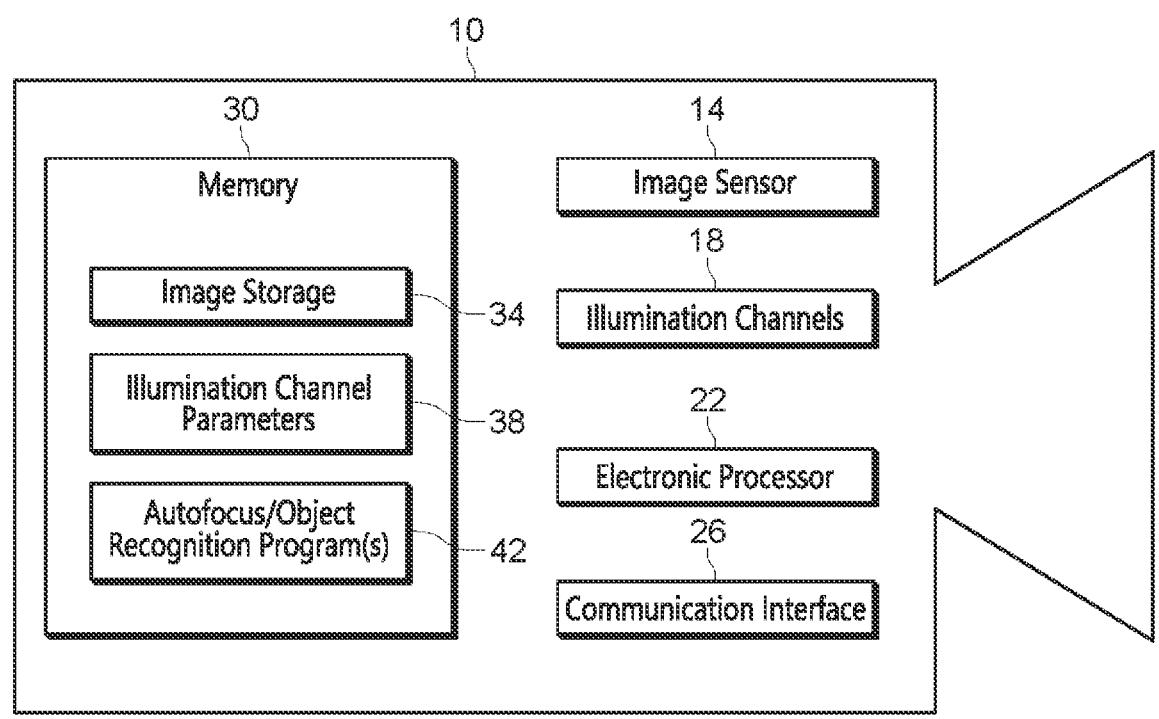
FIG. 1 schematically illustrates a camera, according to some aspects.

Skilled artisans will appreciate that elements in the figures are illustrated for simplicity and clarity and have not necessarily been drawn to scale. For example, the dimensions of some of the elements in the figures may be exaggerated relative to other elements to help improve understanding of examples of the present disclosure.

The system, apparatus, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION

Conventional imaging systems used for object recognition sometimes rely on a dedicated monochrome imager with a bandpass filter that is tailored to an infrared ("IR") illumination source. These systems typically have fixed lenses with the illumination source designed to illuminate objects positioned at a specific distance from the image sensor. Thus, there is a need for a variable zoom imaging system capable of performing illumination blending to provide precise lighting for objects of interest at varying distances from the image sensor. One example provides a variable zoom imaging system including an image sensor, a set of illumination channels, wherein each respective illumination channel of the set of illumination channels includes a set of light sources and a lens, and is associated with a respective focus distance, current driver circuitry for driving the set of illumination channels, and an electronic processor in communication with the image sensor and the set of illumination channels. The electronic processor is configured to focus the image sensor to an object of interest, determine a distance from the image sensor to the object of interest, determine an exposure period for the image sensor, select a subset of illumination channels to activate based at least on the distance from the image sensor to the object of interest, and capture a first image of the object of interest using the image sensor by sequentially activating and deactivating each selected illumination channel of the subset for first respective time frames within the exposure period.

In some aspects, the distance from the image sensor to the object of interest is between a respective focus distance for a first selected illumination channel of the subset and respective focus distance for a second selected illumination channel of the subset.

In some aspects, a field of view of a first selected illumination channel of the subset is greater than a field of view of a second selected illumination channel of the subset, and the electronic processor is further configured to capture a second image of the object of interest using the image sensor by activating the first selected illumination channel of the subset for the exposure period, and combining the first image and the second image to generate a wide dynamic range image.

In some aspects, the first respective time frames are non-overlapping.

In some aspects, a sum of the first respective time frames is equal to the exposure period.

In some aspects, the electronic processor is further configured to capture a second image of the object of interest by sequentially activating and deactivating each selected illumination channel of the subset for second respective time frames within the exposure period, wherein the second respective time frames are different from the first respective time frames.

In some aspects, the electronic processor is configured to combine the first image and the second image.

In some aspects, the electronic processor is further configured to determine an image quality score of the first image, and determine the second respective time frames based on the image quality score.

In some aspects, a field of view of a first selected illumination channel of the subset is greater than a field of view of a second selected illumination channel of the subset, the image quality score indicates an oversaturated region of the first image, and a second respective time frame for the second selected illumination channel of the subset is less than a first respective time frame for the second selected illumination channel of the subset.

In some aspects, the electronic processor is configured to determine the distance from the image sensor to the object of interest based on at least one selected from the group consisting of a zoom level of the image sensor after focusing the image sensor to the object of interest and a field of view of the image sensor after focusing the image sensor to the object of interest.

In some aspects, each respective illumination channel is associated with a respective focus distance range, and the distance from the image sensor to the object of interest is between a respective focus distance range for a first selected illumination channel of the subset and respective focus distance range for a second selected illumination channel of the subset.

In some aspects, the image sensor is a global shutter image sensor.

Another example provides a method for capturing an image using a variable zoom imaging system. The method includes focusing an image sensor to an object of interest, determining a distance from the image sensor to the object of interest, determining an exposure period for the image sensor, selecting a subset of illumination channels from a set of illumination channels to activate based at least on the distance from the image sensor to the object of interest, and capturing a first image of the object of interest using the image sensor by sequentially activating and deactivating each selected illumination channel of the subset for first respective time frames within the exposure period. Each respective illumination channel of the set of illumination channels includes a set of light sources and a lens, and is associated with a respective focus distance.

In some aspects, the distance from the image sensor to the object of interest is between a respective focus distance for a first selected illumination channel of the subset and respective focus distance for a second selected illumination channel of the subset.

In some aspects, the method further includes capturing a second image of the object of interest by sequentially activating and deactivating each selected illumination channel of the subset for second respective time frames within the exposure period, wherein the second respective time frames are different from the first respective time frames.

In some aspects, the method further includes combining the first image and the second image.

In some aspects, the method further includes determining an image quality score of the first image, and determining the second respective time frames based on the image quality score In some aspects, a field of view of a first selected illumination channel of the subset is greater than a field of view of a second selected illumination channel of the subset, the image quality score indicates an oversaturated region of the first image, and a second respective time frame for the second selected illumination channel of the subset is less than a first respective time frame for the second selected illumination channel of the subset.

In some aspects, the first respective time frames are non-overlapping.

In some aspects, a sum of the first respective time frames is equal to the exposure period.

Each of the above-mentioned examples will be discussed in more detail below, starting with example system and device architectures of the system in which the examples may be practiced, followed by an illustration of processing blocks for achieving an improved technical method, device, and system for time-multiplexed illumination blending.

Example examples are herein described with reference to flowchart illustrations and/or block diagrams of methods, apparatus (systems) and computer program products according to example examples. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some examples, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

Further advantages and features consistent with this disclosure will be set forth in the following detailed description, with reference to the figures.

Referring now to the drawings, FIG. 1 schematically illustrates an imaging device 10, according to some examples. The imaging device 10 is, for example, a variable zoom camera 10 including an image sensor 14 for capturing a plurality of images (e.g., a plurality of images included in a video). The image sensor 14 may be a global shutter image sensor 14 or a rolling shutter image sensor 14. In some instances, the imaging device 10 includes multiple image sensors 14 operable to capture light in different frequency ranges. The image sensor 14 may be operable to capture light within the visible light frequency range and/or outside of the visible light frequency range (e.g., infrared or ultraviolet light). The imaging device 10 includes a set of illumination channels 18 configured to emit light for illuminating a scene captured by the image sensor 14. For example, each respective illumination channel 18 in the set of illumination channels 18 includes a set of light sources (e.g., light emitting diodes "LEDs") and a lens or lenslet. The light emitted by the set of illumination channels 18 may include light within the visible light frequency range and/or outside of the visible light frequency range (e.g., infrared or ultraviolet light). The light emitted by the set of illumination channels 18 may include unpolarized or polarized light. For example, one or more illumination channels 18 may include a polarized light filter. Each respective illumination channel 18 is associated with a respective optimal focus distance, otherwise referred to as focus distance or working distance, and configured to illuminate objects positioned at the optimal focus distance relative to the image sensor 14.

The imaging device 10 also includes an electronic processor 22 (for example, a microprocessor or other electronic device). The electronic processor 22 is electrically coupled to the image sensor 14, the set of illumination channels 18, a communication interface 26, and a memory 30. The electronic processor 22 includes suitable processing circuitry for performing the methods described herein or any combination of suitable processing circuitry. For example, the electronic processor 22 may include a digital signal processor (DSP), a graphics processing unit (GPU) embedded processor, a vision processing unit, etc. One or more circuit units included in the electronic processor 22 may operate independently or in parallel with one another.

The memory 30 may include read only memory (ROM), random access memory (RAM), other non-transitory computer-readable media, or a combination thereof. In the example shown, the memory 30 stores data and computer program instructions for performing, among other things, the methods described herein. For example, the memory 30 includes image storage 34 for storing images captured by the image sensor 14, a set of illumination parameters 38 used for activating selected ones of the set of illumination channels 18 to illuminate objects of interest in a scene captured by the image sensor 14, and an autofocus and/or object recognition program 42 executable by the electronic processor 22 for identifying objects of interest in the scene and focusing the image sensor 14 (e.g., by adjusting lenses associated with the image sensor 14) on the objects of interest. The illumination parameters 38 may include characteristics of each illumination channel 18 included in the set of illumination channels 18, such as, for example, optimal focus distances and/or ranges of optimal focus distances, focal lengths, fields of view, illumination intensities, and the like.

The imaging device 10 is operable to send and receive data, such as a video stream, video analytics data, parameter information, and/or commands to one or more external devices using the communication interface 26. In some instances, the autofocus and/or object recognition programs 42 are stored external to the imaging device 10, and the imaging device 10 receives object recognition information and/or control signals via the communication interface 26. The imaging device 10 may otherwise be referred to herein as the camera 10.

The camera 10 may be arranged such that one or more objects of interest passes through the field of view of the camera 10. For example, in some instances, the camera 10 is a stationary camera and mounted to street infrastructure, such as, for example, a stoplight, a streetlight, a road sign, an access controlled point, a bridge, an entrance or exit of a toll road, a highway, or the like. In some instances, the camera 10 is a moving camera mounted to, for example, a base vehicle. However, the camera 10 may be arranged at other locations of base vehicle, such as, for example, the side of a base vehicle or the rear of a base vehicle. The camera 10 is configured to capture images of objects of interest passing through the field of view of the camera 10, in particular, the image sensor 14. Objects of interest may include, for example, vehicles, license plates on vehicles, passengers or drivers of a vehicle, signage, buildings, animals, or the like.

Figure 2:
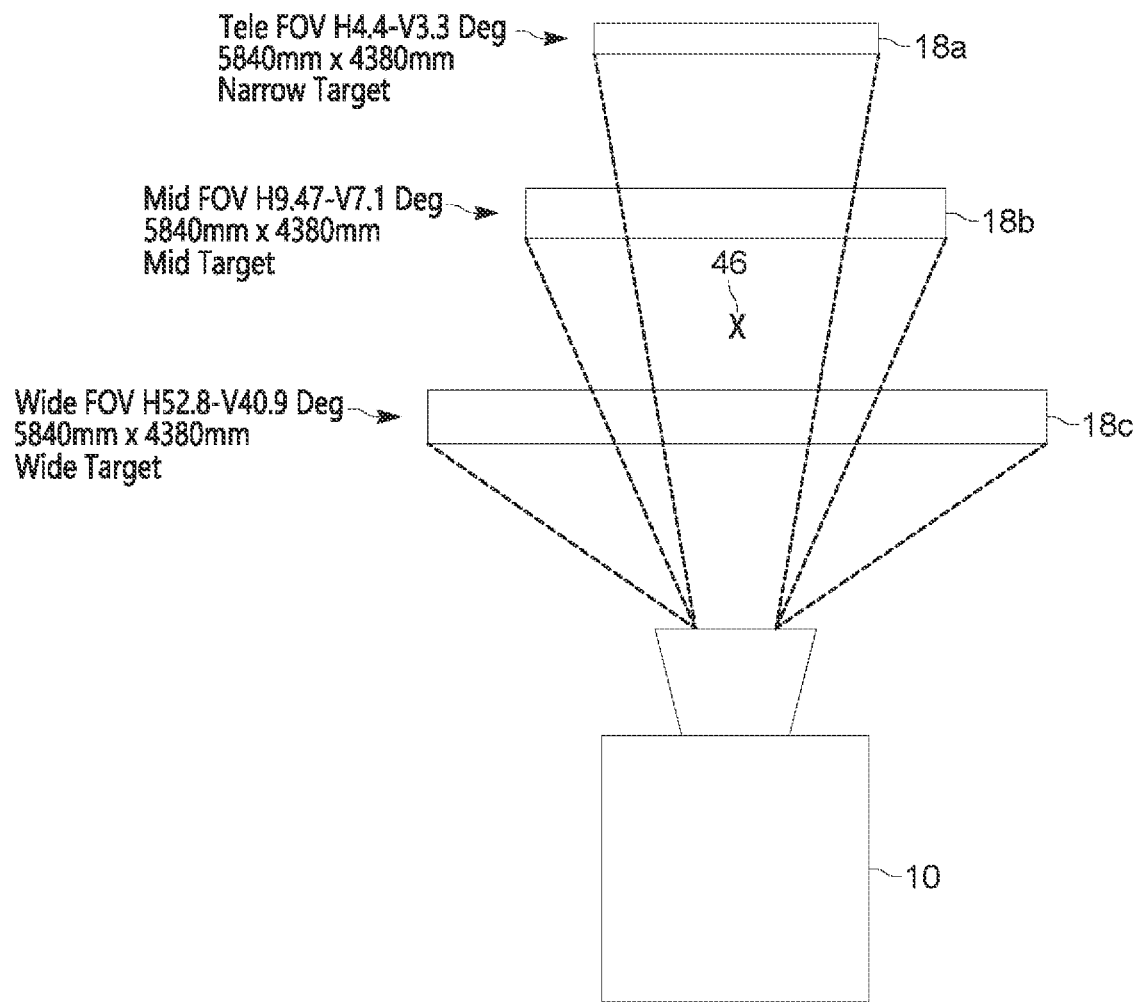
FIG. 2 illustrates a set of illumination channel characteristics for a set of illumination channels, according to some aspects.
Figure 3:
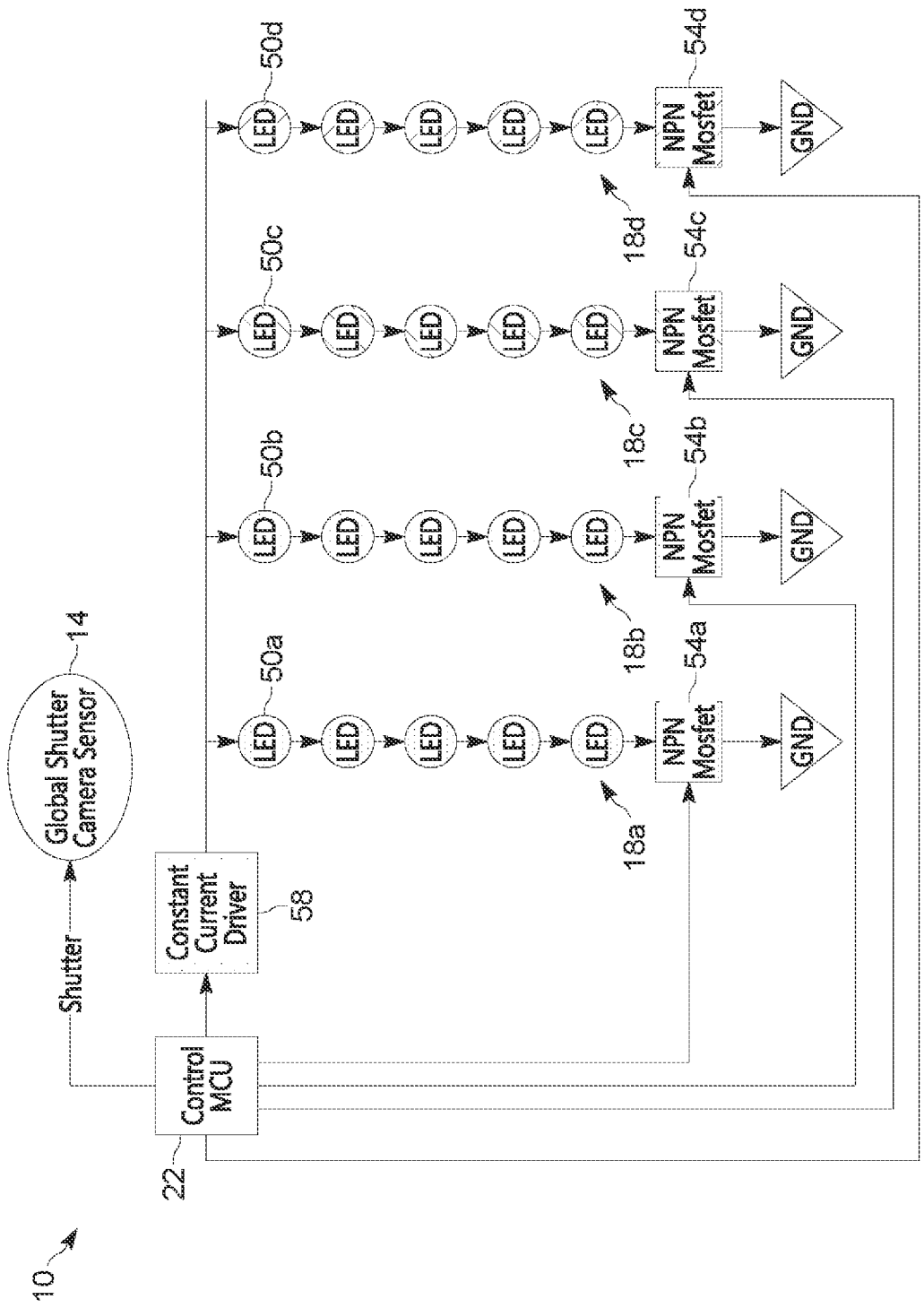
FIG. 3 schematically illustrates an illumination system in a camera, according to some aspects.

As described above, each illumination channel 18 in the set of illumination channels 18 may have a respective field of view and be associated with a respective optimal focus distance, otherwise referred to as working distance. FIG. 2 illustrates a set of illumination channel 18 characteristics for an example set of illumination channels 18. As illustrated in FIG. 3, respective illumination channels 18 associated with farther working distances may have narrower fields of view ("FOV"). For example, the set of illumination channels 18 may include a first illumination channel 18a with, for example, an optimal focus distance of at least 75 meters ("m"), a horizontal FOV of approximately 4.4 degrees, and a vertical FOV of approximately 3.3 degrees for illuminating objects a far distance from the camera 10. The set of illumination channels 18 may include a second illumination channel 18b with, for example, an optimal focus distance of 35 m, a horizontal FOV of approximately 9.47 degrees, and a vertical FOV of 3.3 degrees for illuminating objects a moderate distance from the camera 10. The set of illumination channels 18 may further include a third illumination channel 18c with, for example, an optimal focus distance of 6 m, a horizontal FOV of approximately 52.8 degrees, and a vertical FOV of 40.9 degrees for illuminating objects a short distance from the camera 10.

Characteristics of the set of illumination channels 18 (e.g., optimal focus distances, fields of view, and the like) are not limited to the example illustrated in FIG. 2. Additionally, the set of illumination channels 18 may include more than three illumination channels 18 (e.g., four illumination channels 18, six illumination channels 18, ten illumination channels 18, etc.). Additionally, in some instances, the set of illumination channels 18 includes at least one side illumination channel 18 configured to illuminate objects positioned at a non-central region of a scene (e.g., a left side, a right side, a top side, and/or bottom side).

Objects of interest in the field of view of the camera 10 may be positioned at varying distances from the camera 10. For example, as illustrated in FIG. 2, an example object of interest 46 may be positioned at a distance from the camera 10 that is between the optimal focus distance of the second illumination channel 18b and the third illumination channel 18c. In order to accurately illuminate the object of interest 46, the electronic processor 22 is configured to select a subset of illumination channels 18 to activate based on, for example, the distance of the object of interest 46 to the camera 10. For an object of interest 46 positioned between, for example, the optimal focus distance of the second illumination channel 18b and the optimal focus distance of the third illumination channel 18c, the electronic processor 22 selects the second illumination channel 18b and the third illumination channel 18c to activate. The electronic processor 22 may select the subset of illumination channels 18 based on zoom settings of the image sensor lens (e.g., a zoom level of the lens after focusing on the object of interest 46 and/or a field of view of the lens after focusing on the object of interest 46).

For example, FIG. 3 schematically illustrates the camera 10, in particular an illumination control system of the camera 10, according to some examples. In the illustrated example, the set of illumination channels 18 includes four illumination channels 18a-18d. However, as described above, the number of illumination channels 18 included in the set of illumination channels 18 is not limited to four. In the illustrated example, each illumination channel 18 includes a respective plurality of light sources 50 electrically connected to a respective switch 54 (e.g., a MOSFET switch or another type of switch) for selectively connecting the respective plurality of light sources 50 to a predetermined voltage (e.g., ground) based on a signal received from, for example, the electronic processor 22 to activate the respective illumination channel. A current driver circuit 58 is electrically connected between the electronic processor 22 and the set of illumination channels 18, and is configured to provide a current for driving selected ones of the set of illumination channels 18 (e.g., selected illumination channels 18 for which the corresponding switch 54 is closed). For example, the electronic processor 22 may store a lookup table in the memory 30 including illumination channel parameters 38 corresponding to different zoom settings.

Conventionally, cameras require one driver circuit for every illumination channel included in the camera. Therefore, a conventional camera with four illumination channels would require four driver circuits for respectively driving each of the illumination channels, such that each of the illumination channels are operable to be active (e.g., in an ON state) simultaneously. However, simultaneously activating illumination channels greatly increases peak power consumption of the camera. Additionally, including many driver circuits in illumination control systems may increase electromagnetic interference ("EMI"). Therefore, the camera 10 described herein may include fewer driver circuits 58 than illumination channels 18. For example, the camera 10 may include at least one less driver circuit 58 than a number of illumination channels 18. In the illustrated example, the camera 10 includes one driver circuit 58.

In order to accurately illuminate objects of interest in a scene, the electronic processor 22 selects a subset of illumination channels 18, and sequentially activates and deactivates (e.g., by closing and opening the corresponding switch 54) each selected illumination channel 18 during an exposure period of the image sensor 14. Sequentially activating and deactivating each selected illumination channel 18 during the exposure period may otherwise be referred to herein as time-multiplexing the selected illumination channels 18.

With reference to the example of FIG. 2, the electronic processor 22 selects the second illumination channel 18b and the third illumination channel 18c, and sequentially activates and deactivates the second illumination channel 18b and the third illumination channel 18c. The electronic processor 22 activates each selected illumination channel 18 for a respective predetermined time frame over the course of an exposure period of the image sensor 14. By sequentially activating and deactivating the selected illumination channels 18, rather than simultaneously activating the selected illumination channels 18, the peak power drawn by the camera is reduced.

The respective time frames that each selected illumination channel 18 are active may be the same or different. In some instances, such as, for example, when the camera 10 includes only one current driver circuit 58, the respective time frames that each selected illumination channel 18 is active may be non-overlapping time frames. A sum of the respective time frames may approximately equal the exposure period used in capturing an image of the object of interest.

The electronic processor 22 may determine the respective time frame that each selected illumination channel 18 is active based on an illumination intensity of the selected illumination channels 18 and/or the determined distance between the camera 10 and the object of interest. For example, when the object of interest is positioned between the optimal focus distance of the second illumination channel 18b and the third illumination channel 18c, but nearer to that of the third illumination channel 18c, the electronic processor 22 may set the respective time of the third illumination channel 18c to be longer than the respective time frame of the second illumination channel 18b. In contrast, when the object of interest is positioned between the optimal focus distance of the second illumination channel 18b and the third illumination channel 18c, but nearer to that of the second illumination channel 18b, the electronic processor 22 may set the respective time of the third illumination channel 18c to be shorter than the respective time frame of the second illumination channel 18b.

Figure 4:
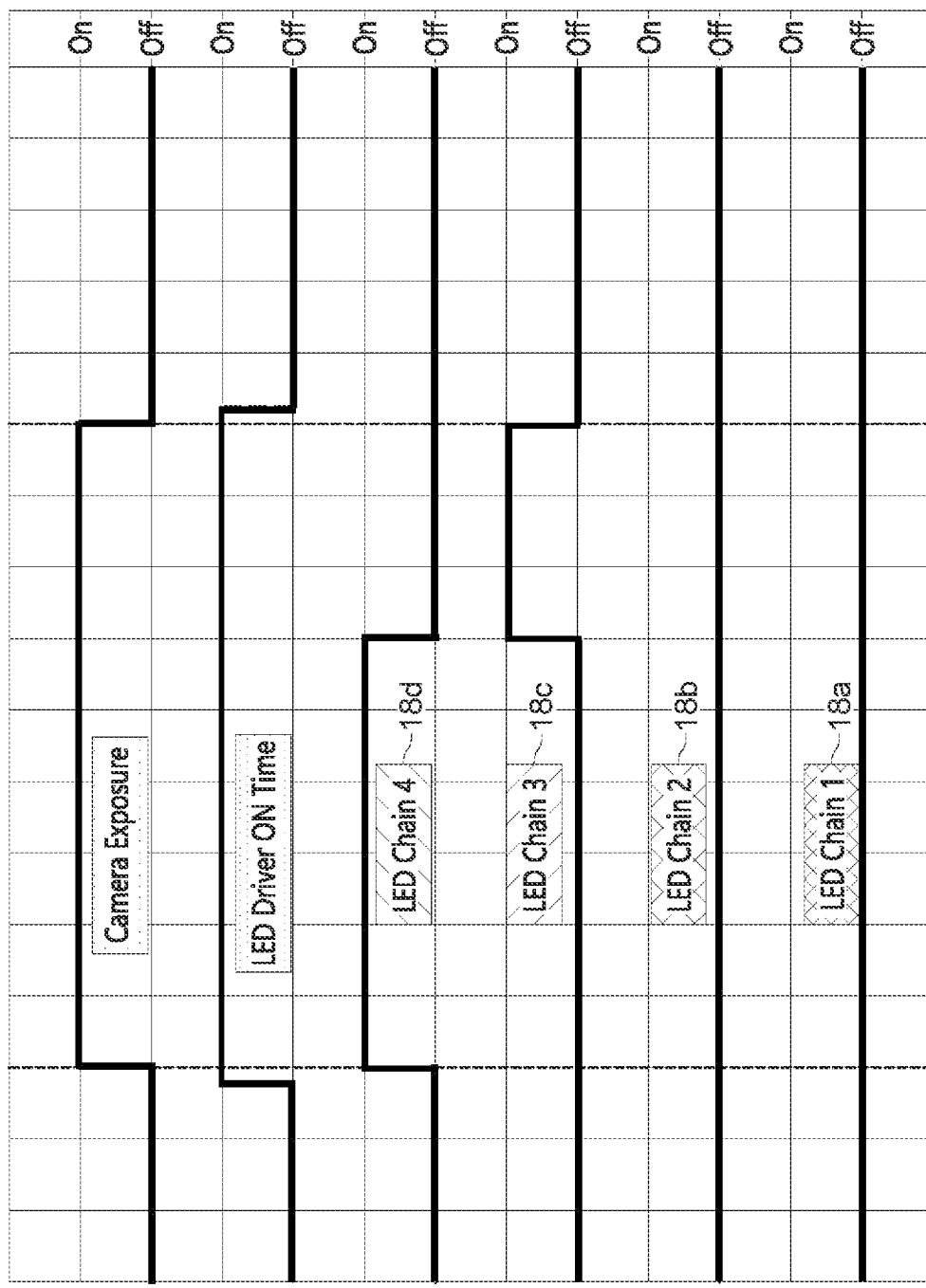
FIG. 4 illustrates an example illumination channel timing waveforms, according to some aspects.

FIG. 4 illustrates example timing control waveforms for capturing an image using a camera 10 having four illumination channels 18, for a scene where an object of interest may be positioned between the respective optimal focus distances of a third illumination channel 18c and a fourth illumination channel 18d. Accordingly, in the illustrated example, the selected illumination channels 18 include the third illumination channel 18c and the fourth illumination channel 18d. The electronic processor 22 controls the current driver circuit 58 to output a drive signal (e.g., an ON signal) to the plurality of illumination channels 18, and, over the course of an exposure period (e.g., the period during which the electronic processor 22 opens a shutter of the camera 10 to expose the image sensor 14 to light), the electronic processor 22 sequentially transmits an ON signal to each of the selected illumination channels 18c and 18d.

In the illustrated example, the electronic processor 22 transmits a first ON signal first to the fourth illumination channel 18d (e.g., to the corresponding switch 54d) for a first time frame, and transmits a second ON signal to the third illumination channel 18c (e.g., to the corresponding switch 54c) for a second time frame that is after the first time frame. In some instances, the electronic processor 22 sequentially activates and deactivates the selected illumination channels 18 in order from the narrowest selected illumination channel 18 (e.g., the selected illumination channel 18 associated with a farthest optical focus distance from the camera 10) to the widest selected illumination channel 18 (e.g., the selected illumination channel 18 associated with the shortest optical focus distance from the camera 10). For example, the fourth illumination channel 18d may be an illumination channel 18 having a narrow FOV and configured to illuminate objects a far distance from the camera 10 (e.g., greater than 75 m, greater than 100 m, or the like). The third illumination channel 18c may be an illumination channel 18 having a moderate FOV and configured to illuminate objects a moderate distance from the camera 10 (e.g., 35 m, 45 m, 65 m, etc.). While the selected illumination channels 18 are described above as being activated and deactivated in a particular order, the order in which each selected illumination channels 18 is activated and deactivated may vary according to implementation. For example, each selected illumination channel 18 may be activated and deactivated in order from the widest selected illumination channel 18 to the narrowest selected illumination channel 18, a user-selected order, or another suitable order.

The electronic processor 22 may determine the exposure period based on a measurement received from a light sensor and/or based on the autofocus and/or object recognition programs 42. The exposure period may range from, for example, 200 microseconds to 1,200 microseconds. As illustrated in FIG. 4, in some instances, the current driver circuit 58 outputs a drive signal to the set of illumination channels 18 for a drive period that is longer than the exposure period. For example, the drive period may begin before the exposure period begins and end after the exposure period ends.

Figure 5:
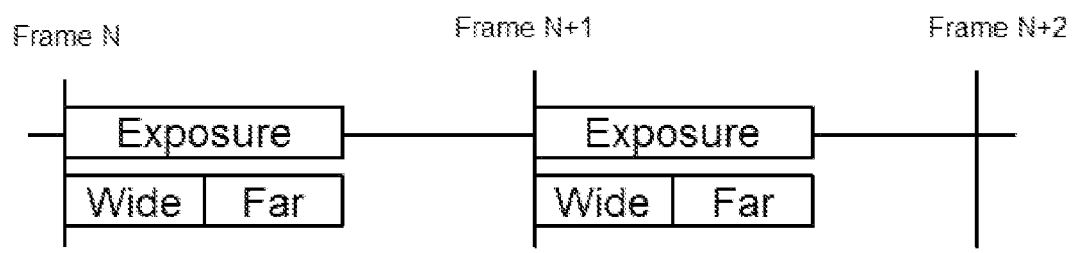
FIG. 5 illustrates example exposure periods, according to some aspects.

Referring now to FIG. 5, in some instances, the camera 10 captures two images sequentially using the selected illumination channels 18. The electronic processor 22 may capture the second image (e.g., a frame N+1 image) using the same selected illumination channels 18 for the same respective time frames and same exposure period as the first image (e.g., a frame N image). In some instances, the electronic processor 22 combines the first image and the second image into a single image. In some instances, the electronic processor 22 modifies the one or more imaging parameters for capturing the second image based on an analysis of the first image by, for example, the object recognition program 42. For example, the electronic processor 22 may use the object recognition program 42 to determine an image quality score of the first image (the frame N image), and modify an imaging parameter of the camera 10 based on the image quality score before capturing the second image (the frame N+1 image). The modified imaging parameters may include a modified illumination intensity of at least one of the selected illumination channels 18, a change in the respective time frames that each selected illumination channel 18 is active during the exposure period, a modified shutter speed, a modified aperture, a modified focus setting, and/or the like.

In some instances, the modified imaging parameters includes an adjustment of polarized light captured by the image sensor 14. For example, a camera polarization filter can increase image contrast, reduce glare, and/or improve outdoor visibility by removing polarized light that is reflected toward the camera 10. However, polarized light filters may require rotation (e.g., by 90 degrees) based on, for example, polarization angle of light reflected off of objects being photographed (e.g., windshields on vehicles). Therefore, the camera 10 may include a filter changer for adjusting polarization between sequentially captured images.

In some instances, the image sensor 14 includes multiple polarized filters in lieu of or in addition to RGB filters. In such instances, during an exposure period, the image sensor 14 is operable to collect different types of polarized light for each filter option (e.g., 0 degrees, 90 degrees, 180 degrees, and/or 270 degrees). The electronic processor 22 may time-multiplex the selected illumination channels 18 over an exposure period such that respective image sensor pixels with associated polarizers collect respective orientations of polarized light based on the polarization filters.

Figure 6:
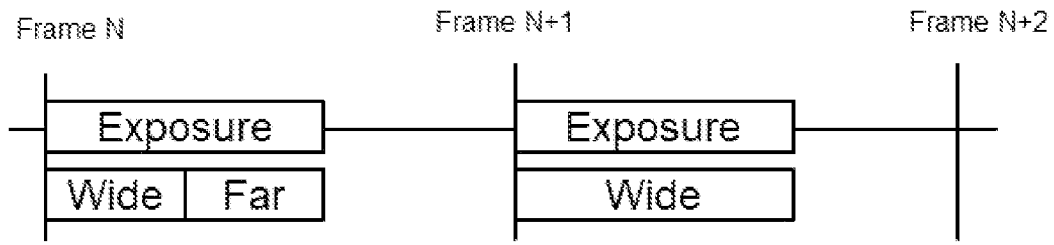
FIG. 6 illustrates example exposure periods, according to some aspects.

Referring now to FIG. 6, in some instances, blending two or more illumination channels 18 results in an oversaturated region, or hot spot, in the captured image. In order to mitigate the risk of hot spots, the electronic processor 22 may sequentially capture a first image (e.g., a frame N image) followed by a second image (e.g., a frame N+1 image), and combine the two captured images to generate a single wide dynamic range ("WDR") image. The first image may be an over-illuminated image and the second image may be an under-illuminated image. For example, when capturing the first image during a first exposure period, the electronic processor 22 may sequentially activate and deactivate each of the selected illumination channels 18 for respective time frames. In contrast, when capturing the second image during a second exposure period, the electronic processor 22 may increase the respective time frame that a wider selected illumination channel 18 is active and decrease the respective time frame that a narrower selected illumination channel 18 is active. In some instances, such as in the illustrated example, the respective time frame that the narrower selected illumination channel 18 is active is reduced to 0 microseconds when capturing the second image. The first exposure period may be the same as the second exposure period. By controlling subsequent exposure periods to be the same as a previous exposure period, rather than modifying the subsequent exposure period, the electronic processor 22 or other image analysis systems are able to more accurately predict where the object of interest will appear in upcoming frames. By maintaining short exposure periods, rather than lengthening exposure periods in low-light scenarios, the electronic processor 22 is able to reduce a risk of blue in captured images.

Figure 7:
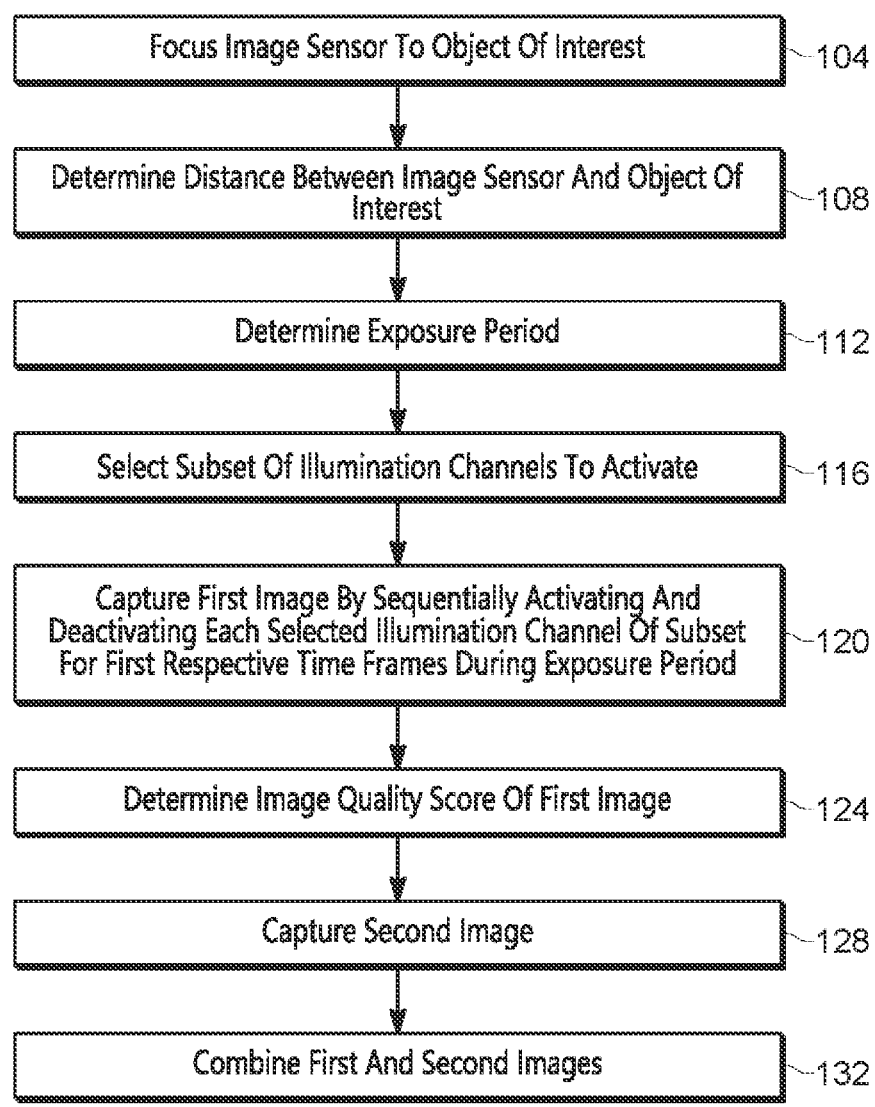
FIG. 7 illustrates an illumination control method for a variable zoom camera, according to some aspects.

FIG. 7 illustrated an example method 100 for performing illumination blending through time-multiplexed integration time. The method 100 is performed by, for example, the electronic processor 22 in conjunction with other components of the camera 10. The method 100 includes focusing the image sensor 14 (e.g., one or more lenses associated with the image sensor 14) to an object of interest in the field of view of the camera 10 (at block 104). As described above, the camera 10 may be variable zoom camera 10. Accordingly, as used herein, focusing on the object of interest may include not only adjusting the lenses associated with the image sensor 14 to obtain a clear view of the object of interest, but also zooming in on the object of interest. For example, the object of interest may be a license plate, and the electronic processor 22 controls the camera 10 to zoom in on the license plate such that characters of the license plate are at least a minimum size necessary for image processing (e.g., a minimum pixel count in height and/or width).

The electronic processor 22 determines a distance from the image sensor 14 to the object of interest based on a zoom level of the image sensor 14 after focusing on the object of interest and/or a field of view of the image sensor 14 after focusing on the object of interest (at block 108). The electronic processor 22 also determines an exposure period for capturing an image of the object of interest (at block 112). At least based on the determined distance from the image sensor 14 to the object of interest, the electronic processor 22 selects a subset of illumination channels 18 from the set of illumination channels 18 to activate when capturing an image of the object of interest (at block 116). For example, the electronic processor 22 selects the subset of illumination channels 18 such that the distance from the image sensor 14 to the object of interest is between a respective optimal focus distance for a first selected illumination channel 18 of the subset and respective optimal focus distance for a second selected illumination channel 18 of the subset.

Using the image sensor 14, the electronic processor 22 captures a first image of the object of interest by sequentially activating and deactivating each selected illumination channel 18 of the subset for first respective time frames within the exposure period (at block 120). As described above, each first respective time frame for the selected illumination channels 18 of the subset may be the same or different from one another. In some instances, the method 100 further includes determining an image quality score of the captured first image using the object recognition program 42, and determining a modification of imaging parameters based on the image quality score (at block 124).

In some instances, the method 100 includes capturing, using the image sensor 14, a second image of the object of interest (at block 128). For example, a field of view of a first selected illumination channel 18 of the subset may be greater (e.g., wider) than a field of view of a second selected illumination channel 18 of the subset, and the electronic processor 22 captures the second image of the object of interest by sequentially activating and deactivating each selected illumination channel 18 of the subset for second respective time frames within the exposure period. The second respective time frames may be the same or different from the first respective time frames. For example, in some instances, a second respective time frame corresponding to a first illumination channel 18 is increased relative to the first respective time frame for the first illumination channel 18, while a second respective time corresponding to a second illumination channel 18 is decreased relative to the first respective time frame for the second illumination channel 18. In some instances, at least one of the second respective time frames is reduced to zero while another of the second respective time frames is increased to be equal to the exposure period. In some instances, the method 100 includes combining the first captured image and the second captured image, for example, to generate a WDR image (at block 132).

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot capture and store images, among other features and functions set forth herein).

In the foregoing specification, various examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if examples described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example examples may be written in an object oriented programming language such as Java, Smalltalk, C++, Python, or the like. However, the computer program code for carrying out operations of various example examples may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A variable zoom imaging system comprising:
   an image sensor;
   a set of illumination channels, wherein each respective illumination channel of the set of illumination channels includes a set of light sources and a lens, and is associated with a respective focus distance;
   current driver circuitry for driving the set of illumination channels; and
   an electronic processor in communication with the image sensor and the set of illumination channels, the electronic processor configured to:
   focus the image sensor to an object of interest,
   determine a distance from the image sensor to the object of interest,
   determine an exposure period for the image sensor, the exposure period being a time during which the electronic processor controls a shutter to remain open, exposing the image sensor to light,
   select a subset of illumination channels to activate based at least on the distance from the image sensor to the object of interest, and
   capture a first image of the object of interest using the image sensor by, for each of the subset of illumination channels, controlling a switch corresponding to the illumination channel to sequentially activate and deactivate each selected illumination channel of the subset for first respective time frames within the exposure period.

2. The variable zoom imaging system of claim 1, wherein the distance from the image sensor to the object of interest is between a respective focus distance for a first selected illumination channel of the subset and respective focus distance for a second selected illumination channel of the subset.

3. The variable zoom imaging system of claim 1, wherein
   a field of view of a first selected illumination channel of the subset is greater than a field of view of a second selected illumination channel of the subset, and
   the electronic processor is further configured to:
   capture a second image of the object of interest using the image sensor by activating the first selected illumination channel of the subset for the exposure period, and
   combining the first image and the second image to generate a wide dynamic range image.

4. The variable zoom imaging system of claim 1, wherein the first respective time frames are non-overlapping.

5. The variable zoom imaging system of claim 1, wherein a sum of the first respective time frames is equal to the exposure period.

6. The variable zoom imaging system of claim 1, wherein the electronic processor is further configured to:
   capture a second image of the object of interest by sequentially activating and deactivating each selected illumination channel of the subset for second respective time frames within the exposure period,
   wherein the second respective time frames are different from the first respective time frames.

7. The variable zoom imaging system of claim 6, wherein the electronic processor is configured to combine the first image and the second image.

8. The variable zoom imaging system of claim 6, wherein the electronic processor is further configured to:
   determine an image quality score of the first image, and
   determine the second respective time frames based on the image quality score.

9. The variable zoom imaging system of claim 8, wherein
   a field of view of a first selected illumination channel of the subset is greater than a field of view of a second selected illumination channel of the subset,
   the image quality score indicates an oversaturated region of the first image, and
   a second respective time frame for the second selected illumination channel of the subset is less than a first respective time frame for the second selected illumination channel of the subset.

10. The variable zoom imaging system of claim 1, wherein the electronic processor is configured to determine the distance from the image sensor to the object of interest based on at least one selected from the group consisting of a zoom level of the image sensor after focusing the image sensor to the object of interest and a field of view of the image sensor after focusing the image sensor to the object of interest.

11. The variable zoom imaging system of claim 1, wherein each respective illumination channel is associated with a respective focus distance range, and the distance from the image sensor to the object of interest is between a respective focus distance range for a first selected illumination channel of the subset and respective focus distance range for a second selected illumination channel of the subset.

12. The variable zoom imaging system of claim 1, wherein the image sensor is a global shutter image sensor.

13. A method for capturing an image using a variable zoom imaging system, the method comprising:
   focusing an image sensor to an object of interest;
   determining a distance from the image sensor to the object of interest;
   determining an exposure period for the image sensor, the exposure period being a time during which the electronic processor controls a shutter to remain open, exposing the image sensor to light;
   selecting a subset of illumination channels from a set of illumination channels to activate based at least on the distance from the image sensor to the object of interest; and
   capturing a first image of the object of interest using the image sensor by, for each of the subset of illumination channels, controlling a switch corresponding to the illumination channel to sequentially activate and deactivate each selected illumination channel of the subset for first respective time frames within the exposure period,
   wherein each respective illumination channel of the set of illumination channels includes a set of light sources and a lens, and is associated with a respective focus distance.

14. The method of claim 13, wherein the distance from the image sensor to the object of interest is between a respective focus distance for a first selected illumination channel of the subset and respective focus distance for a second selected illumination channel of the subset.

15. The method of claim 13, further comprising:
   capturing a second image of the object of interest by sequentially activating and deactivating each selected illumination channel of the subset for second respective time frames within the exposure period,
   wherein the second respective time frames are different from the first respective time frames.

16. The method of claim 15, further comprising: combining the first image and the second image.

17. The method of claim 15, further comprising:
   determining an image quality score of the first image; and
   determining the second respective time frames based on the image quality score.

18. The method of claim 17, wherein
   a field of view of a first selected illumination channel of the subset is greater than a field of view of a second selected illumination channel of the subset,
   the image quality score indicates an oversaturated region of the first image, and
   a second respective time frame for the second selected illumination channel of the subset is less than a first respective time frame for the second selected illumination channel of the subset.

19. The method of claim 13, wherein the first respective time frames are non-overlapping.

20. The method of claim 13, wherein a sum of the first respective time frames is equal to the exposure period.

* * * * *